C. A. BROWN.
FILTER.
APPLICATION FILED AUG. 25, 1916.

1,383,384.

Patented July 5, 1921.

Inventor:
Charles A. Brown

UNITED STATES PATENT OFFICE.

CHARLES A. BROWN, OF LORAIN, OHIO, ASSIGNOR OF ONE-THIRD TO GEO. G. EARL AND ONE-THIRD TO ALBERT B. WOOD, BOTH OF NEW ORLEANS, LOUISIANA.

FILTER.

1,383,384.  Specification of Letters Patent.  Patented July 5, 1921.

Application filed August 25, 1916. Serial No. 116,775.

*To all whom it may concern:*

Be it known that I, CHARLES A. BROWN, a citizen of the United States, residing at Lorain, in the county of Lorain and State of Ohio, have invented certain new and useful Improvements in Filters; and I do hereby declare the following to be a full, clear, and exact description of the invention, such as will enable others skilled in the art to which it appertains to make and use the same.

My invention relates to apparatus for filtering water, such as is more particularly adapted to be used to filter water in large quantities to be supplied to large corporations, towns or cities, etc.

One of the objects of my invention is to provide means for facilitating the cleansing of the filtering material, which generally consists of various sizes of such substances as sand and gravel, and which may be more or less thoroughly graded by hydraulic action, the coarser particles at the bottom and the finer particles nearer the surface, the whole constituting the filter bed of what is commonly known as a mechanical filter.

As is well known, the filter bed is employed as a support for the bridging action of coagulated matter carried by the water to be filtered. The coagulated matter, being coarser than the interstices between the sand particles, bridges the interstices and forms a strainer, much finer than the interstices of the sand bed itself, which retains additional coagulated matter and other impurities. The water passing through this very fine-pored mineral screen is purified thereby and as it is continually bringing additional coagulated matter to said screen, which is deposited therein, the thickness of this very finely porous filtering medium is being constantly increased. With increasing thickness of this layer comes an increasing resistance to the passage of water through it until eventually the resistance becomes too great to be overcome economically. The filter must then be washed and when so washed it is desirable that all or nearly all of the coagulated matter shall be carried away from the filter by the wash water, and it is highly important that if any coagulated matter is not so carried away and remains on the surface of the sand, that it shall be in a very finely divided state, so as to be carried away the next time the filter is washed. The main objection to leaving any of this material in the filter bed after any washing of the bed is found in its tendency to agglomerate into larger masses of such size that they cannot be carried away by the wash water. One of the purposes of my invention is to prevent such agglomerations.

A filter bed is washed by forcing water upward through the sand, which lifts and partially liquefies the sand bed. If the rate of upward flow is sufficient, rakes may be forced through the sand while the bed is washing, but this is objectionable because the cost of installing and maintaining, and of driving the rakes is great.

I am aware also that other methods, such as forcing air upward through the sand or filter beds, either before or during the application of the wash water, have been widely used, but this has not proven entirely satisfactory and is gradually losing favor. Other attempts, such as larger volumes of wash water, have also been made, but have proven expensive in first cost and more or less unsatisfactory. When carelessly used, which often happens, this last named method causes loss of sand and expense to replace it.

Furthermore, the use of very rapid rates in washing tends to lift the sand higher than a low rate. This means the spaces between the sand particles are increased and less attrition between the sand grains obtained during the wash, and, therefore, there is a less tendency for the sand particles to clean themselves of adhering coagulated matter than where lower rates of washing are employed.

I aim to provide means whereby the action of the wash water facilitates friction between the sand particles, so that the friction of the sand particles against themselves and the means employed will increase preferably in proportion to the quantity of wash water applied, and also to prevent the wasting of the sand at any practical rate of washing.

Another object of my invention is to cause each unit of wash water to carry away the largest possible load of impurities caught by the filter while filtering, thus reducing the quantity of wash water required to cleanse the filter and reducing the cost of washing.

Other objects of my invention and the invention itself will be probably better understood from a description of an embodiment of my invention.

Figure 1:
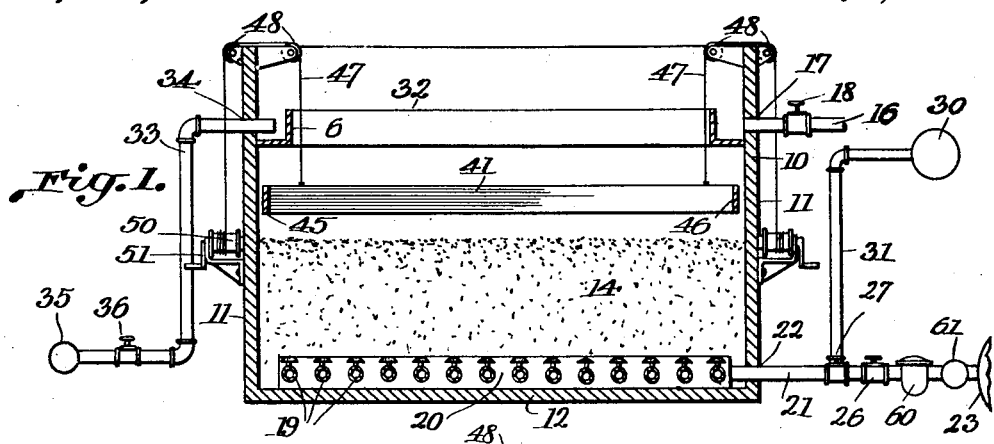
Figure 1 is a sectional view of an embodiment of my invention.

Referring now to the drawings, and to the embodiment shown therein, the filter is shown at 10, the side walls being illustrated at 11, the bottom at 12 and the ends at 13. While I have shown a rectangular filter, it will be understood that any suitable form or shape of filter may be employed. The sand bed is shown at 14, extending in the embodiment shown from the bottom to the sand line 15. A pipe 16 enters the filter through an opening 17 in the wall of the filter and conveys the water to be filtered into the filter. The flow into the filter is controlled by a valve 18. In the bottom of the filter there are provided manifolds shown at 19 connected to a mother manifold 20, which is connected to a pipe 21 leading through an opening 22 in the wall of the filter and through which the filtered water passes outward to a destination, such as a clear water reservoir, and from which it may be delivered to a distant point or distributed as desired. The water, passing downward through the filter bed enters the manifold through the strainer heads shown at 24, which are here shown as mushroom shaped and provided with a plurality of openings in the top.

At 30 is shown a source of wash water under pressure, which may be from a clear water reservoir or a pump. The source 30 is connected by a pipe 31 to the pipe 21 leading to the manifold at the bottom of the filter. A valve 26 is provided between the outlet 23 and the junction 29 of the pipes 31 and 21, and a valve 27 is provided in the pipe 31.

The wash trough is shown at 32. A pipe 33 is shown leading through the wall of the filter at 34 into the trough 32, through which the waste water flows to a destination 35, which may be a sewer. A valve 36 is placed in the pipe 33, preferably just outside the wall 11 of the filter.

I provide means for causing the sand particles and the impurities caught by the filter which are floated and separated by the upward rush of the wash water while washing to be brought together and made to grind against each other and against other objects, whereby any agglomeration of the impurities is prevented or broken up and the sand particles are scoured of adhering impurities. The impurities being thus disintegrated into very small particles are readily carried away to the sewer by the wash water while the sand is thoroughly cleaned and retained in the filter.

Figure 2:
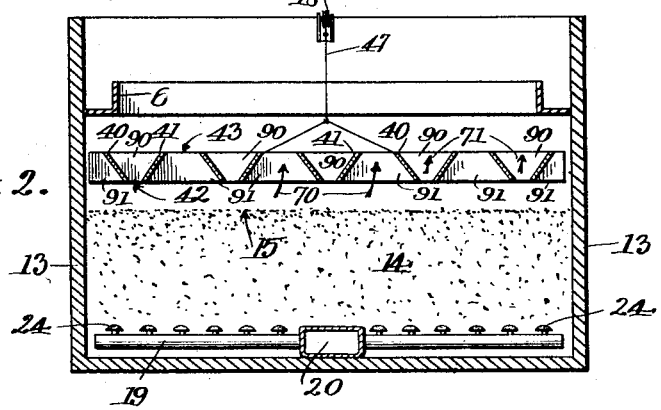
Fig. 2 is a second sectional view taken at right angles to Fig. 1.
Figure 3:
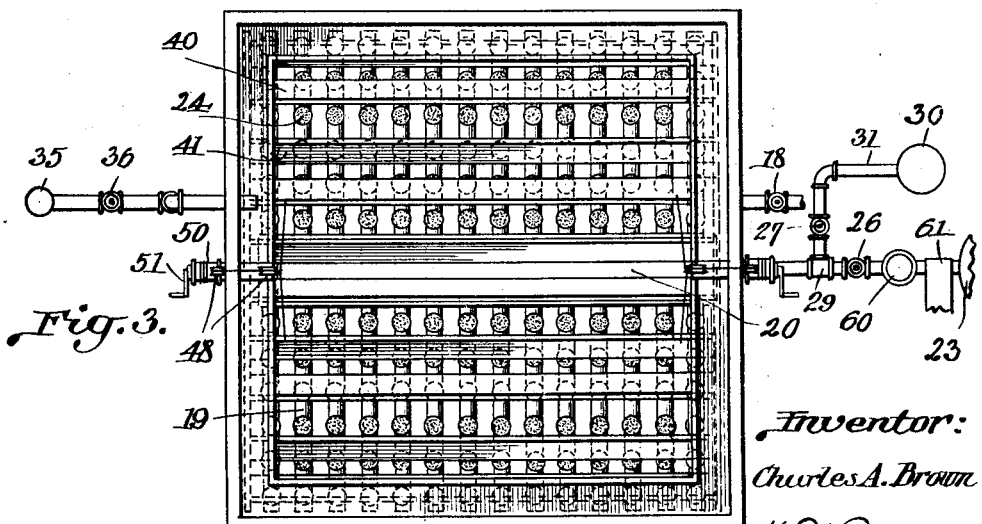
Fig. 3 is a plan view of the embodiment shown in Figs. 1 and 2.

In the form shown, this means consists of a plurality of plates, shown at 40 and 41. These plates are inclined to the walls of the filter, the plates 41 being inclined in one direction and the plates 40 in another direction. Each of the plates 40 is so arranged with respect to a plate 41 that a relatively small opening is left at 42 in what might be termed the bottom of a trough formed by each plate 40 and 41. Larger openings 43 are formed between the tops of the adjacent troughs, as shown to good advantage in Fig. 2. The plates are preferably arranged to be raised and lowered in the filter, within certain limits, and in the embodiment illustrated, the ends of the plates are connected through cables 47 over pulleys 48 to some means for raising and lowering them, such as windlasses 50 operated by cranks 51 in a well known manner. While I have shown these as movable by means of the device shown, it must be understood this is only for convenience in adjusting the height above the sand level when filtering. In service they are fixed in one position and maintained in that position immovably and could, if desired, be placed in one position and maintained there with no provision to move them, although this would not be quite as convenient when it was desired to get at and inspect the sand bed. A filter controller is shown diagrammatically at 60 and a clear water reservoir at 61.

The operation of the embodiment of my invention shown in the drawings is as follows: When it is desired to filter water, the valves 36 and 27 are closed and the valves 18 and 26 opened. The water to be filtered flows in through the pipe 16, the water level in the filter being maintained at or about a definite level, passes downwardly to the surface of the sand between the plates through the openings 42 and 43. Owing to the arrangement of the plates most of the flow will pass through the openings 43, while a considerable volume of water in a more quiet state will always be over each pair 40 and 41 of plates. The quiet or semi-quiet condition of this water will have a tendency to cause sedimentation on the top side of each of the plates 40 and 41, and, therefore, may cause the troughs formed by each pair 40 and 41 of plates to become partially or even completely filled with coagulated matter, if the quantity of coagulated matter in the water to be filtered is very large.

The amount of this coagulated matter caught and retained in the troughs prevents this quantity of coagulated matter from reaching the sand bed and has a tendency to permit the filter to be operated longer without washing than would be the case without this action.

The coagulated water to be filtered which passes through the openings 43, together with the coagulation carried with it will pass through the screen of filtering matter deposited on the sand, then downward through the sand, leaving its load of coagulation to increase the thickness and resistance of the filtering layer.

Gradually the resistance to the passage of water through the filtering layer increases and the time comes when the filter bed must be washed; that is, the impurities caught by the sand must be removed from the filter. The valves 18 and 26 are then closed and the valves 27 and 36 opened. Wash water from the source 30 flows through the duct 31 through the manifolds and up through the sand bed over the side 6 of the wash trough into the wash trough 32 and out through the duct 33. Under this upward rush of washwater the sand bed lifts and liquefies in a well known manner. This, unaided, will carry away many of the impurities if they be in a very finely divided state, but if they be agglomerated into masses of considerable size, the washing is imperfectly done and the masses of impurities thus agglomerated will remain in the filter, causing trouble in many ways.

Many of the impurities are such as to agglomerate into masses of considerable size and have caused trouble at many points. When first formed, they are quite small, sometimes not much over one-sixteenth of an inch in diameter. By accretion they may grow to larger masses, known commonly as mud balls, of irregular shape, sometimes measuring an inch or more in their major diameter. Although readily broken up in the first stages, they become more resistive as they grow in size.

The wash water lifting and liquefying the sand bed carries these mud balls up with it, but not sufficiently high to allow the mud balls to enter the wash trough and be removed, or if this does occur, a great deal of sand is carried away along with the mud balls and wasted.

In the embodiment illustrated the lifting of the sand bed and the mud balls therewith causes both the sand and the mud balls to be lifted above the top of each pair of plates 40—41, the major portion at the start rising through the contracting passages 91 terminating at 43. The flow upward through 42 and the expanding passages 90 communicating therewith being small, the velocity of upward flow at the top and inside of such expanding passages 90 is small; in fact, the water is practically quiescent. The sand spreading from the upward flow through the openings 43 spills into the quiet water in the troughs, which has insufficient velocity of flow to support it therein; consequently, it falls into the passages 90 and passes downward through the opening 42 back to be again caught by the upward flow and lifted through the passages 91 and through the cycle again. The opening 42 may be restricted so as to offer some resistance to the volume of sand tending to pass downward. The trough within a few seconds then becomes loaded, sand being heaped above the top of the trough in the center and working back through the opening 42 to be again caught and lifted into the trough. The grinding of the sand particles against each other and the sides of the plates results in an action of the sand with and against any mud balls of any size, and this action is sufficient to disintegrate such agglomerations and also to cleanse the sand very thoroughly. The disintegration of the mud balls into exceedingly small particles enables the wash water at proper velocities to lift and carry these upward to the top of and into the wash troughs and from there they are carried to the sewer and away from the filter. In doing this, the rate of washing can be made so low as to keep any of the sand from wasting.

The breaking up of these agglomerations of impurities enables the efficiency of the wash water to be largely increased, and, therefore, decreases the cost of cleaning the filter, as well as increasing its efficiency as a filter.

I prefer to arrange the plates at an angle greater than the angle of repose of the filter sand in water, so when the wash water is shut off, all the sand in the troughs will return to the filter bed. I also prefer to use the form of attrition members consisting of plates 40 and 41 which I have illustrated. The rubbing or attrition effect of the particles may, of course, be varied by changing the velocity of the wash water.

It will, however, be understood that various and numerous departures may be made from these and other details, as well as from the particular embodiment shown, without departing from the spirit of my invention, this particular embodiment having been shown to better enable me to describe the invention.

I claim:—

1. In a filter, the combination of a filter bed of sand or like material having a normal filtering level below the top of the filter, a wash trough and means located below the wash trough and above the normal filtering level of the filter bed for causing the particles of sand or like material used in the filter bed to rub together.

2. In a filter, the combination of a filter bed of sand or like material having a normal filtering level below the top of the filter, a wash trough and means located below the wash trough and above the normal filter level of the filter bed for causing the particles of sand or like material used in the filter bed to rub together and apparatus for causing a flow of fluid through the filter to carry the particles of sand or similar material used in the filter bed back and forth through said means, said sand returning to the filter bed at the close of the operation.

3. In a filter, the combination of a filter bed consisting of particles of sand or like material, a wash trough, means for carrying wash water through the filter bed and apparatus below the wash trough in the path of the flow of the wash water for causing the filter bed particles to move at various velocities within the filter.

4. In a filter, the combination of a filter bed composed of particles of a suitable filtering material, a wash trough, means for conducting wash water upward through said filter bed at a velocity sufficient to move said particles, and means below said wash trough for reducing the velocity of the wash water carrying said particles below the point at which it is capable of carrying said particles.

5. In a filter, the combination of a filter bed composed of particles of sand or like material, means for introducing the wash water at the bottom or near the bottom of the filter bed, said wash water being introduced under conditions under which it bears upwardly with it the particles composing the filter bed, means interposed in the path of the wash water through the filter provided with a plurality of passages, some of which are wider and some of which are narrower at the bottom than at the top and means for conducting the wash water from the filter.

6. In a filter, the combination of a filter bed composed of particles of sand or like material, means for introducing wash water to the filter at or near the bottom of the filter bed under conditions under which the particles of the filter bed are carried upward with the wash water, a plurality of troughs in the path of the wash water, some of the troughs being wider and some being narrower at the bottom than at the top, said troughs being adjacent each other so that the matter passing upward through one may pass downward through the other, a wash trough and means for permitting the wash water to flow through said wash trough from the filter after it has passed through said troughs.

7. In a filter, the combination of a filter bed composed of particles of sand or like material, means to introduce wash water at or near the bottom of the filter bed under conditions under which it carries with it the particles composing the filter bed and the particles of impurities therein, a plurality of plates each of which is inclined to the horizontal interposed in the path of the wash water through the filter, the alternate plates being inclined in opposite directions, a wash trough in said filter above said plates and a duct for communicating with the wash trough for removing the wash water from the filter.

8. In a filter, the combination of a filter bed composed of particles of sand or like material, means to introduce wash water at or near the bottom of the filter bed under conditions under which it carries with it the particles composing the filter bed and the particles of impurities therein, a plurality of plates each of which is inclined to the horizontal, interposed in the path of the wash water through the filter, the alternate plates being inclined in opposite directions, a wash trough in said filter above said plate, a duct for communicating with the wash trough for removing the wash water from the filter, and apparatus for changing the elevation of said plates in said filter.

9. In a filter, the combination of a filter bed, composed of particles of sand or like material, said bed having a normal filtering level below the top of the filter, means for introducing at or near the bottom of the filter bed wash water under conditions under which it carries upward with it in its passage through the filter the particles composing the filter bed and any impurities therein contained, means above the normal level of the filter bed and in the path of the wash water carrying said particles provided with a plurality of passages for the water carrying such particles, some of the passages expanding and others contracting in the general direction of flow of such wash water, each expanding and each contracting passage being next adjacent a passage of opposite kind, a wash trough in the filter into which the wash water flows after it passes said means and a duct for conveying the wash water from the filter.

10. In a filter, the combination of a filter bed, composed of particles of sand or like material, said bed having a normal filtering level below the top of the filter, means for introducing at or near the bottom of the filter bed wash water under conditions under which it carries upward with it in its passage through the filter the particles composing the filter bed and any impurities therein contained, means above the normal level of the filter bed and in the path of the wash water carrying said particles, a plurality of passages for the water carrying such particles, some of the passages expanding and others contracting in the general direction of flow of such wash water, each expanding and each contracting passage being next adjacent a passage of opposite kind, a wash trough in the filter into which the wash water flows after it passes said means, a duct for conveying the wash water from the filter, and apparatus for moving said means.

11. In a filter, the combination of a filter bed composed of particles of sand or like material having a normal filtering level below the top of the filter, means for introducing at or near the bottom of the filter bed a supply of wash water under conditions under which in passing upward through the filter it carries with it part of the way at least the particles composing the filter bed and any impurities contained therein, means located above the normal filtering level of the filter bed comprising a plurality of passages for the wash water, some of which are contracted and some of which are expanded from bottom to top in the line of flow of wash water through the filter, said passages being alternated so that on each side of each contracting passage there is an expanding passage, and on each side of each expanding passage there is a contracting passage, a wash trough in said filter and means to convey the wash water from the wash trough away from the filter.

12. In a filter, the combination of a filter bed composed of particles of sand or the like, apparatus to introduce at or near the bottom of the filter a supply of wash water under conditions under which it rises in the filter carrying with it the particles composing the filter bed and any particles of impurities therein, means comprising a plurality of pairs of plates set at angles to each other to form a plurality of alternate contracting and expanding passages for the wash water as it passes through the filter, a wash trough in said filter and means to permit the wash water to flow from the trough to the outside of the filter.

13. In filtering apparatus, a retaining box, a bed of filtering material therein, conduits beneath said material adapted to convey water, a grating above said bed having a plurality of passages converging upwardly, a plurality of additional passages alternately arranged in respect to said first mentioned passages and converging downwardly.

14. In filtering apparatus, a retaining box, a bed of filtering material therein, conduits beneath said material adapted to convey water, a grating above said bed having a plurality of passages converging upwardly, a plurality of additional passages alternately arranged in respect to said first mentioned passages and converging downwardly, the openings in the diverging end of said first mentioned passages being larger than those of the second mentioned passages, whereby the streams in the first mentioned passages carry sediment and deposit it in the second mentioned passages.

15. In filtering apparatus, a retaining box, a bed of sand in said box, conduits in said sand, a plurality of bars spaced above said bed and inclined laterally in alternate directions, whereby a plurality of passages diverging in opposite directions are formed, the passages converging downwardly being of less cross section at the constricted end than those converging upwardly, and means for admitting wash water to said conduits whereby the water passes upwardly at greater velocity through the last mentioned passages and deposits sand in the other of said passages.

16. In filtering apparatus, a box, a bed of sand, conduits in said sand, means for admitting water above said bed and for withdrawing it through said conduits, means for sending wash water in a reverse direction through said conduits and said sand, a plurality of spaced troughs arranged above said bed with the apices extending downwardly, said troughs having narrow openings in said apices, the sides of adjacent troughs forming passages that converge upwardly, whereby the major part of the wash water passes through said passages and deposits sand in said troughs.

17. In filtering apparatus, a box, a bed of sand therein, a wash trough above said bed, conduits in said bed, means for admitting water above said bed and for withdrawing it through said conduits, means for sending wash water in a reverse direction through said conduits and said sand, a plurality of spaced troughs arranged between said bed and said wash trough with the apices extending downwardly, said troughs having narrow slits in the apices, the walls of adjacent troughs forming passages that converge upwardly, whereby the major part of the wash water passes through said passages and deposits the sand in said last mentioned troughs.

In witness whereof I have hereunto signed my name this 21st day of August, 1916.

CHARLES A. BROWN.